US012761855B2

(12) United States Patent
Obana et al.

(10) Patent No.: US 12,761,855 B2
(45) Date of Patent: Oct. 13, 2026

(54) REALISTIC LIGHTING FOR FISH TANK-STYLE VR DISPLAY

(71) Applicant: Sony Interactive Entertainment Inc., Tokyo (JP)

(72) Inventors: Koichi Obana, San Mateo, CA (US); Yuichiro Nakamura, San Mateo, CA (US); Greg Corson, San Mateo, CA (US); Jeff Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/484,704

(22) Filed: Oct. 11, 2023

(65) Prior Publication Data

US 2025/0123787 A1 Apr. 17, 2025

(51) Int. Cl.
*G06F 3/14* (2006.01)
*G09G 3/20* (2006.01)

(52) U.S. Cl.
CPC ......... *G06F 3/1446* (2013.01); *G09G 3/2092* (2013.01); *G09G 2320/028* (2013.01); *G09G 2320/0626* (2013.01); *G09G 2320/066* (2013.01); *G09G 2320/0686* (2013.01)

(58) Field of Classification Search
CPC ...... G09G 3/2092; G09G 3/3208; G09G 3/36; G09G 3/348; G09G 3/003; G09G 3/32; G09G 3/3225; G09G 2320/0666; G09G 3/002; G09G 2354/00; G09G 2320/066; G09G 2360/144; G09G 3/2003; G09G 2300/0452; G09G 2300/0456; G09G 2300/023; G09G 3/3446; G09G 2320/0673; G09G 2320/0626; G09G 2330/021; H04N 13/31; H04N 13/398; H04N 13/388; H04N 13/366; H04N 13/363; H04N 13/324; G02B 30/27
See application file for complete search history.

(56) References Cited

U.S. PATENT DOCUMENTS 8,830,225 B1 * 9/2014 Karakotsios .......... G06F 16/954 345/419
9,886,229 B2 * 2/2018 Christmas ................. G06F 3/14
10,505,086 B2 12/2019 Hsieh et al.
(Continued)

FOREIGN PATENT DOCUMENTS

CN 106847172 A * 6/2017 ........... G09G 3/3208
CN 107957010 A * 4/2018 ............... F21K 9/68
(Continued)

OTHER PUBLICATIONS

Obana et al., "Display Rotation to Increase Virtual Fov for Fish Tank-Style VR System", related U.S. Appl. No. 18/484,409, Non-Final Office Action dated Jun. 18, 2024. (1273-203).
(Continued)

*Primary Examiner* — Shaheda A Abdin
(74) *Attorney, Agent, or Firm* — Fish & Richardson P.C.

(57) ABSTRACT

Techniques are described for varying brightness and/or contrast in multiple displays of a box-shaped flat panel display assembly according to the viewing angle of the user. Also, techniques are described for providing, on the displays, images of real world background surrounding the display, the better to mimic a transparent tank, resembling a fish tank.

20 Claims, 8 Drawing Sheets

(56) References Cited

U.S. PATENT DOCUMENTS

| | | | |
|---|---|---|---|
| 10,768,421 B1 | 9/2020 | Rosenberg et al. | |
| 11,520,217 B1 | 12/2022 | Benedetto | |
| 11,804,162 B2 * | 10/2023 | Byun | G09G 3/2003 |
| 12,120,583 B2 * | 10/2024 | Christmas | H04L 51/063 |
| 2002/0027608 A1 | 3/2002 | Johnson et al. | |
| 2004/0085256 A1 | 5/2004 | Hereld et al. | |
| 2005/0094040 A1 * | 5/2005 | Wang | G02F 1/133621 349/19 |
| 2009/0094658 A1 * | 4/2009 | Kobayashi | H04N 21/4325 725/118 |
| 2010/0118006 A1 * | 5/2010 | Kimura | G09G 3/3611 348/673 |
| 2013/0021390 A1 * | 1/2013 | Inada | G09G 3/2022 345/690 |
| 2015/0061999 A1 | 3/2015 | Kim et al. | |
| 2015/0269880 A1 * | 9/2015 | Ge | G09G 3/2003 345/690 |
| 2016/0094840 A1 | 3/2016 | Warner | |
| 2016/0162244 A1 | 6/2016 | Christmas et al. | |
| 2016/0267684 A1 | 9/2016 | Li et al. | |
| 2016/0267685 A1 * | 9/2016 | Yang | G09G 3/2003 |
| 2017/0242646 A1 * | 8/2017 | Lee | G06F 3/1462 |
| 2017/0310956 A1 * | 10/2017 | Perdices-Gonzalez | G09G 3/2092 |
| 2018/0324396 A1 | 11/2018 | Ishikawa et al. | |
| 2019/0022539 A1 | 1/2019 | Kamata et al. | |
| 2020/0128174 A1 | 4/2020 | Lin et al. | |
| 2020/0211440 A1 | 7/2020 | Lee et al. | |
| 2020/0225737 A1 | 7/2020 | Limor et al. | |
| 2020/0400951 A1 | 12/2020 | Zhang | |
| 2022/0317767 A1 | 10/2022 | Zhang et al. | |
| 2023/0072188 A1 | 3/2023 | Gibby et al. | |
| 2023/0247176 A1 | 8/2023 | Kita | |
| 2024/0069503 A1 | 2/2024 | Park et al. | |
| 2025/0117077 A1 | 4/2025 | Obana et al. | |
| 2025/0138315 A1 | 5/2025 | Obana et al. | |
| 2025/0139923 A1 | 5/2025 | Obana et al. | |

FOREIGN PATENT DOCUMENTS

| | | | | |
|---|---|---|---|---|
| CN | 111602100 A * | 8/2020 | G06T 15/60 |
| JP | H05210166 A * | 8/1993 | |
| JP | 2024173860 A * | 12/2024 | |
| WO | WO-2017149254 A1 * | 9/2017 | G06F 3/0304 |

OTHER PUBLICATIONS

"International Search Report and Written Opinion", dated Dec. 19, 2024, from the counterpart PCT application PCT/US24/050365.

[No Author Listed] archive.org screenshot, Amsler grid, Chart 1, Apr. 21, 2022, retrieved on Aug. 6, 2025, retrieved from <https://web.archive.Org/web/20220804002026/https://en.wikipedia.org/wiki/Amsler_grid>, 6 pages.

Farard et al., "Calibration Methods for Effective Fish Tank VR in Multi-Screen Displays," CHI EA '17 Proceedings of the 2017 CHI Conference Extended Abstracts on Human Factors in Computing Systems, May 6, 2017, pp. 373-376.

Wagemakers et al., "Interactive Visual Calibration of Volumetric Head-Tracked 3D Displays," CHI '17 Proceedings of the 2017 CHI Conference on Human Factors in Computing Systems, May 2, 2017, pp. 3943-3953.

Zhou et al., "Automatic Calibration of a Multiple-Projector Spherical Fish Tank VR Display," 2017 IEEE Winter Conference on Applications of Computer Vision (WACV), 2017, pp. 1072-1081 (10 pages).

Ware et al., "Fish Tank Virtual Reality," Paper, Presented at CHI '93: Proceedings of the INTERACT '93 and CHI '93 Conference on Human Factors in Computing Systems, Amsterdam, Netherlands, Apr. 24-29, 1993, 7 pages.

* cited by examiner

REALISTIC LIGHTING FOR FISH TANK-STYLE VR DISPLAY

FIELD

The present application relates to technically inventive, non-routine solutions that are necessarily rooted in computer technology and that produce concrete technical improvements, and more specifically to four-sided display assemblies for mixed reality.

BACKGROUND

As understood herein, so-called "fish tank" display assemblies have been provided. Such assemblies render the image on the display coupled to the head position of the observer as if he/she looks into a fish tank. One display or plural flat panel displays arranged in a box-shaped configuration and can be controlled to produce images resembling a fish tank.

SUMMARY

As further understood herein, a user typically will have different viewing angles to each display of the assembly that the user can see, and the brightness/contrast of objects rendered over multiple displays differs on each display as a consequence. That can make the viewing user feel the 3D scene presented looks unrealistic. Present techniques enable the brightness/contrast on each display to be adjusted actively depending on the viewing angle to improve this situation.

Accordingly, an apparatus includes at least one processor assembly configured to determine first and second viewing angles to first and second displays of a multi-display assembly. The processor assembly is configured to use the first viewing angle to establish a first brightness and/or a first contrast on the first display, and use the second viewing angle to establish a second brightness and/or a second contrast on the second display.

In some examples the displays include liquid crystal displays (LCD). In example implementations the multi-display assembly is box-shaped.

In non-limiting embodiments the first viewing angle is along a normal to the first display and the second viewing angle is along an oblique angle relative to a normal of the second display, and the second brightness and/or second contrast is greater than the first brightness and/or first contrast.

In example embodiments the processor assembly can be configured to receive at least one image of at least one real world (RW) view adjacent the multi-display assembly, and present the image on at least the first display of the multi-display assembly in a display location corresponding to where the RW view would be seen through the first display were the first display a transparent plate. "View" refers to the fact that opaque display panels are meant to show a video image (from a camera) of the view behind the display, as if the display was actually just transparent glass (like a fish tank). In effect, a camera image of the display is not viewing any particular surface, but an entire scene (anything behind the opaque display); thus, the term "view" makes more sense here, as the "view" from the camera is being used for display on the opaque display.

In another aspect, an apparatus includes at least one computer medium that is not a transitory signal and that in turn includes instructions executable by at least one processor assembly to receive at least one image of at least one real world (RW) view adjacent a multi-display assembly. The instructions also are executable to present at least a portion of the image on at least a first display of the multi-display assembly in a display location corresponding to where the RW view would be seen through the first display were the first display a transparent plate.

If desired, the instructions may be executable to present at least a portion of the image on at least a second display of the multi-display assembly in a display location corresponding to where the RW view would be seen through the second display were the second display a transparent plate.

In another aspect, a method includes executing A, or B, or both A and B. "A" includes determining first and second viewing angles to first and second displays of a multi-display assembly, using the first viewing angle to establish a first brightness and/or a first contrast on the first display, and using the second viewing angle to establish a second brightness and/or a second contrast on the second display. On the other hand, "B" includes receiving at least one image of at least one real world (RW) view adjacent the multi-display assembly, and presenting the image on at least the first display of the multi-display assembly in a display location corresponding to where the RW view would be seen through the first display were the first display a transparent plate.

The details of the present disclosure, both as to its structure and operation, can be best understood in reference to the accompanying drawings, in which like reference numerals refer to like parts, and in which:

DETAILED DESCRIPTION

Figure 1:
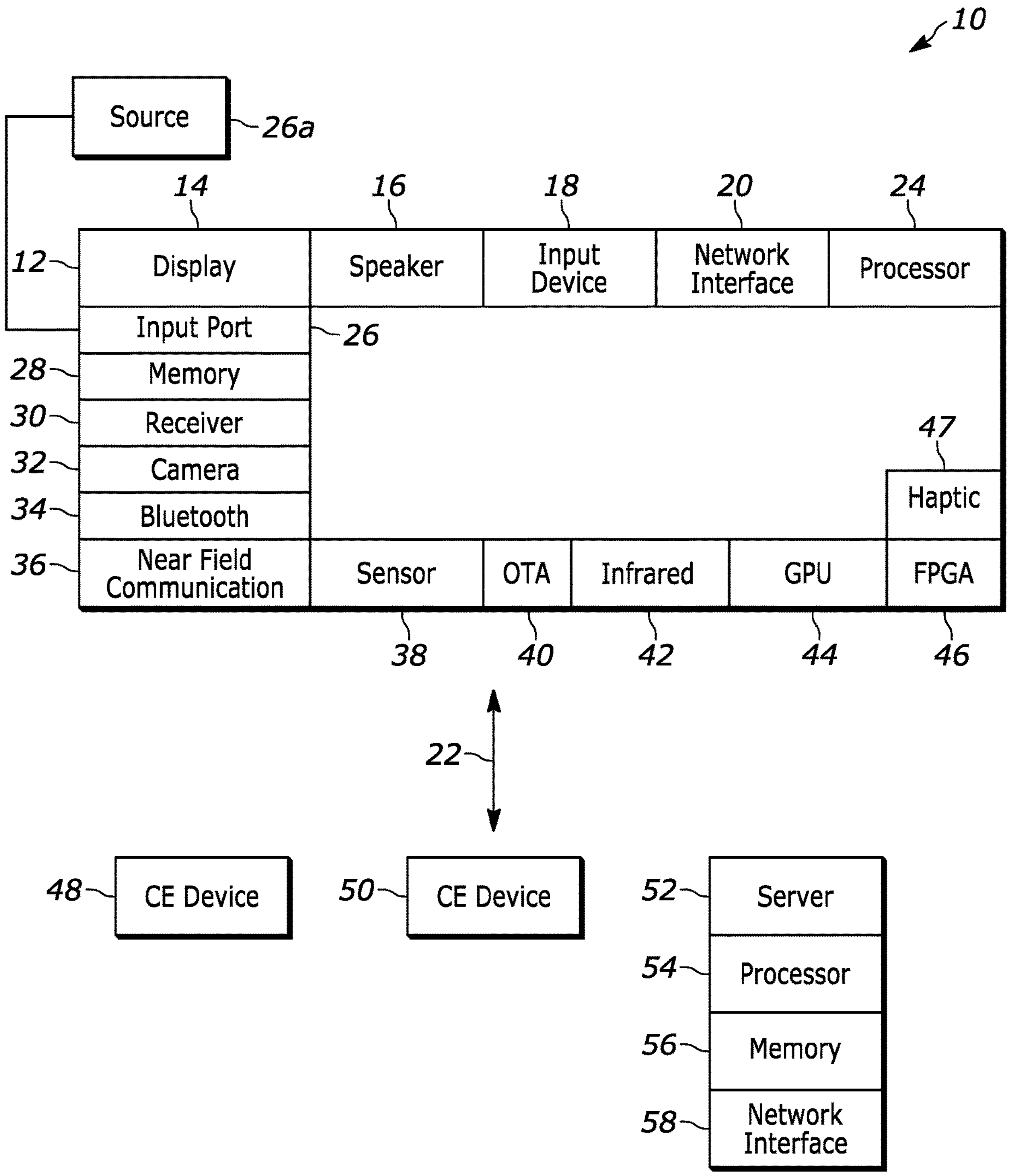
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles. The display may be an example of the fish tank displays described elsewhere herein or the fish tank display may be connected via one or more of the interfaces of CE device 12.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
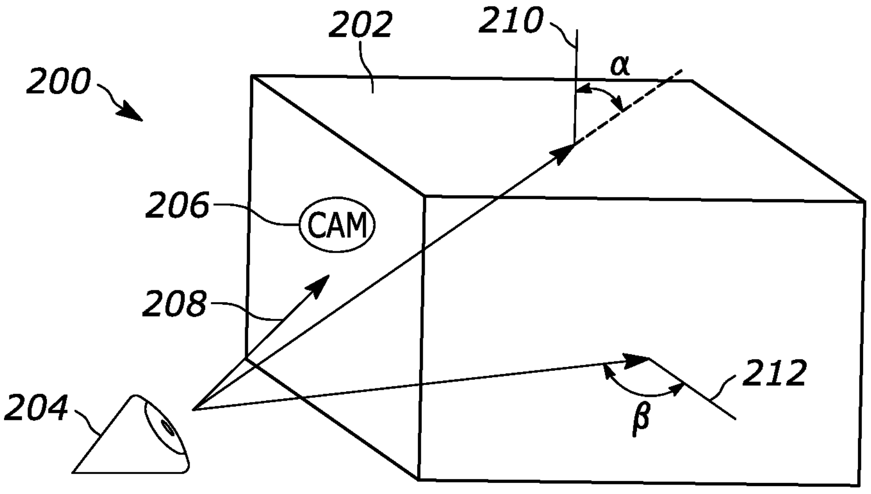
FIG. 2 illustrates an example multi-display assembly, shown here in oblique form for illustration

FIG. 2 illustrates a multi-display assembly 200 which has plural flat panel displays 202. In the example shown, the display assembly is box-shaped and thus has four side displays and one top display arranged on an open or solid base, to resemble a fish tank. Other configurations are contemplated. The displays 202 may be flat panel display such as liquid crystal displays (LCD) or light emitting diode (LED) displays or projection displays such as disclosed in commonly-owned U.S. Pat. No. 11,520,217, incorporated herein by reference. In any case, as set forth in detail herein, depending on the angle of view of a user 204 to each display 202 (which may include angles of view to each pixel or group of pixels of a display) as imaged by one or more cameras 206, brightness and/or contrast may be varied to each display. Accordingly, brightness and/or contrast may be varied for each individual display according to the angle of view, which includes varying brightness and/or contrast for each individual pixel and/or group of pixels depending on the angle of view to the pixel and/or group of pixels.

Brightness refers to the overall lightness of the image while contrast refers to the difference between the darkest and lightest colors.

For disclosure purposes, the angle of view may be expressed herein relative to the surface normal of each display (or pixel or group of pixels). Thus, the angle of view of the user 204 to the closest display 202 is directly along the normal 208 of that closest display, and hence is zero using the convention of the instant disclosure.

In contrast, the angles of view to the top display and right side display of the assembly 200 shown in FIG. 2 are oblique to the surface normal of those displays (and their respective pixels). Thus, the angle of view to the top display relative to its normal 210 forms an oblique angle $\alpha$ with the normal 210, whereas the angle of view to the right side display relative to its normal 212 forms an oblique angle $\beta$ with the normal 212 which is greater (using the example convention herein) than the angle of view a to the top display.

In example embodiments, the more direct the user is looking at a given display, the less the brightness and/or contrast needs to be adjusted for that display, while the more obliquely the user is looking at a display, the greater the adjustment to the brightness and/or contrast for that display. In the example of FIG. 2, the brightness and/or contrast for the nearest display with surface normal 208 is less than the brightness and/or contrast for the top display with surface normal 210, which in turn is less than the brightness and/or contrast for the right side display with surface normal 212. Note that FIG. 2 is shown in oblique form and the eye 204 can see all three displays.

In one example, the brightness and/or contrast varies linearly with the angle of view. In other examples, the brightness and/or contrast varies non-linearly with the angle of view. For example, the brightness and/or contrast may vary with the square or the cube of the angle of view. Or, the brightness and/or contrast may vary quadratically with the angle of view. Yet again, the brightness and/or contrast may vary logarithmically or exponentially or trigonometrically with the angle of view.

Figure 3:
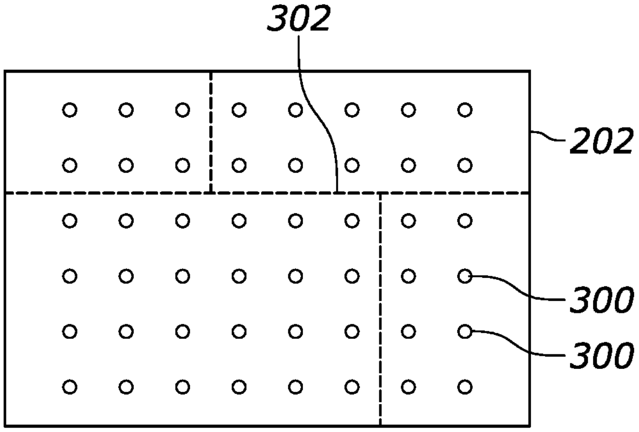
FIG. 3 illustrates schematically the pixels of a display.

FIG. 3 illustrates a display 202 of the assembly 200 which includes plural pixels 300, which may be divided into groups of pixels as illustrated by the dashed lines 302. As indicated above, brightness and/or contrast may vary according to the angle of view to a display 202, such as to the center of the display, with the brightness and/or contrast of all pixels or groups of pixels being the same, or brightness and/or contrast may vary according to the angle of view to each pixel 300 or group of pixels 302 of the display 202.

Figure 4:
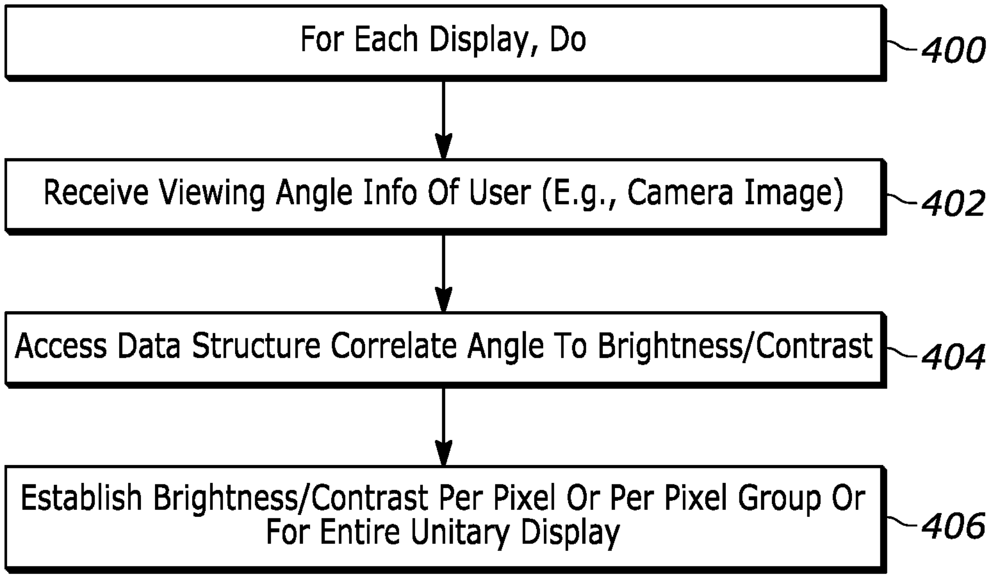
FIG. 4 illustrates example logic in example flow chart format for establishing brightness and/or contrast based on viewing angle.

FIG. 4 further illustrates the principles above. Commencing at state 400, for each display (or portion thereof) of a display assembly such as the display assembly 200, the viewing angle is received at state 402 from, e.g., an image of the user from a camera mounted at a known, fixed location on the assembly (and hence from whence an angle of view to each display can be determined). Proceeding to state 404, a data structure such as a lookup table, or other structure may be accessed, or a compute process, or combinations of a compute process and data structure access is used to correlate the angle of view to brightness and/or contrast, which is/are established at state 406, per pixel, or group of pixels, or entire display.

Figure 5:
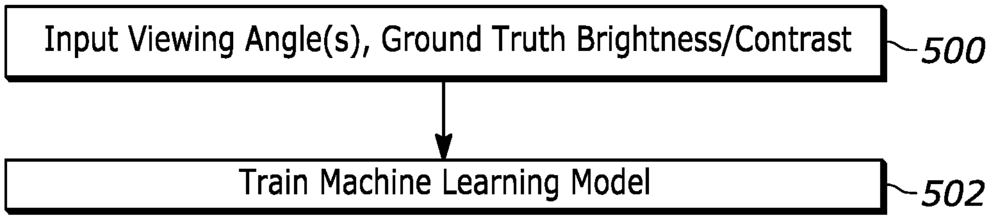
FIGS. 5 and 6 illustrate example logic in example flow chart format for an alternative embodiment using machine learning.
Figure 6:
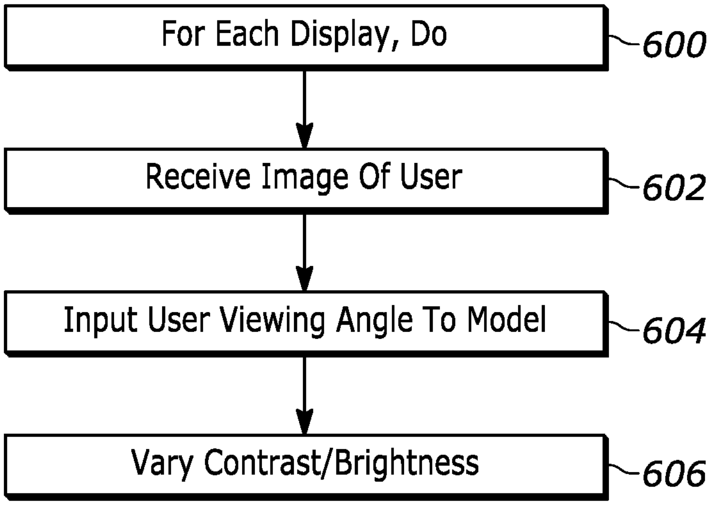

FIGS. 5 and 6 illustrate an alternate technique using machine learning (ML). Commencing at state 500 in FIG. 5, ground truth viewing angles with ground truth brightness and/or contrast are input to a ML model to train the model at state 502.

Once the model is trained, at state 600 in FIG. 6, for each display (including each pixel or group of pixels of a display), the logic moves to state 602 to receive an image of the viewing user, which is used to determine the viewing angle to input to the ML model at state 604. The output of the model is used at state 606 to establish the brightness and/or contrast for the display/pixel/groups of pixels based on the viewing angle determined from the image of the viewing user.

Figure 8:
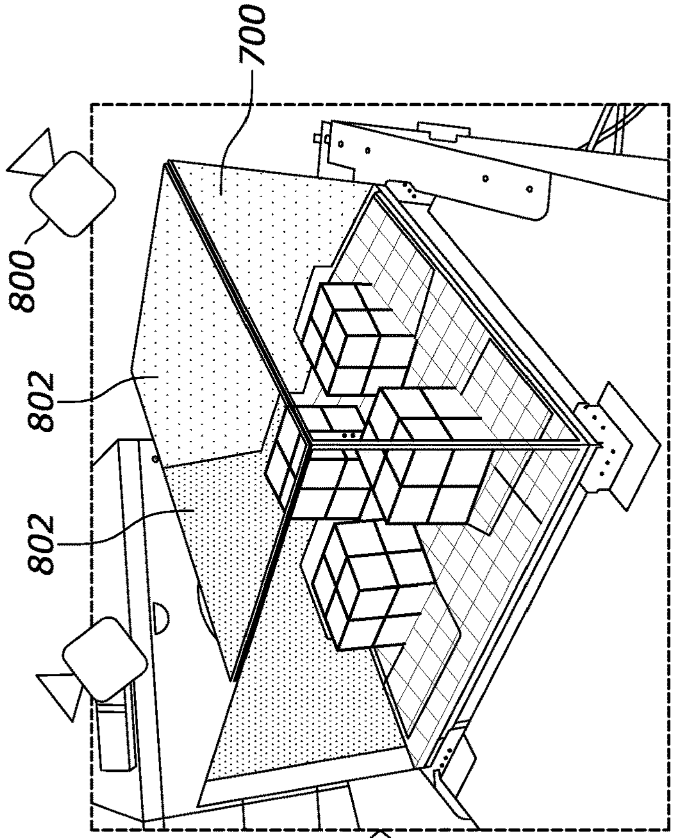
FIG. 8 illustrates the example multi-display assembly of FIG. 7 with images of the RW background being presented on the assembly in display locations corresponding to where the RW background would be seen through the display assembly were the display assembly made of transparent panes or plates.
Figure 7:
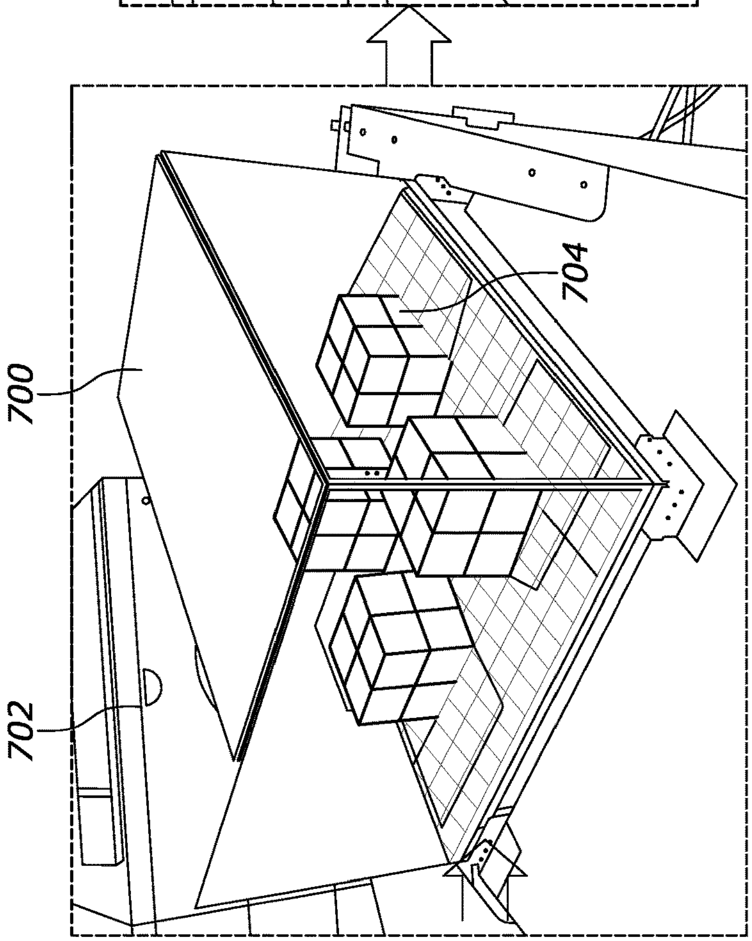
FIG. 7 illustrates an example multi-display assembly blocking real world (RW) background from being seen.

Now refer to FIGS. 7 and 8. In FIG. 7 a multi-display assembly 700 that may be implemented by any multi-display assembly described herein is shown in front of background surfaces 702, in the example shown, cabinetry. The blocks 704 represent virtual objects in a virtual scene displayed on the displays of the assembly 700 in 3D. As shown, unlike real fish tanks which are transparent and through which one would be able to see the background 702, the assembly 700 blocks view of those portions of the background 702 on the opposite side of the assembly along the line of sight.

FIG. 8 illustrates that one or more cameras 800, in the example shown, external to the assembly 700, may be used to capture images of the background 702 for presentation on one or more of the displays of the assembly 700 as indicated by the regions 802. The lighting environment around the assembly 700 can be also reflected with this method. Thus, the regions 802 present images of the real world background 702 that the user otherwise would see along his line of sight toward the assembly 700 were the assembly 700 transparent. The images of the background presented on the display(s) of the assembly 700 thus are images of the RW background behind and blocked by the assembly 700. In other words, the image 802 of the RW background 702 that is presented on the multi-display assembly 700 is presented in a display location corresponding to where the RW background would be seen through the display(s) were the display(s) transparent panes or plates.

FIGS. 9-12 illustrate that it is possible to locate one or more cameras for imaging the background 702 inside the assembly 700 particularly in the case of displays that are organic light emitting diodes (LED). The cameras can also be used for head tracking. In this way, eternal views can be captured without affecting the displays and more than one external view can be captured with a single camera.

Figure 10:
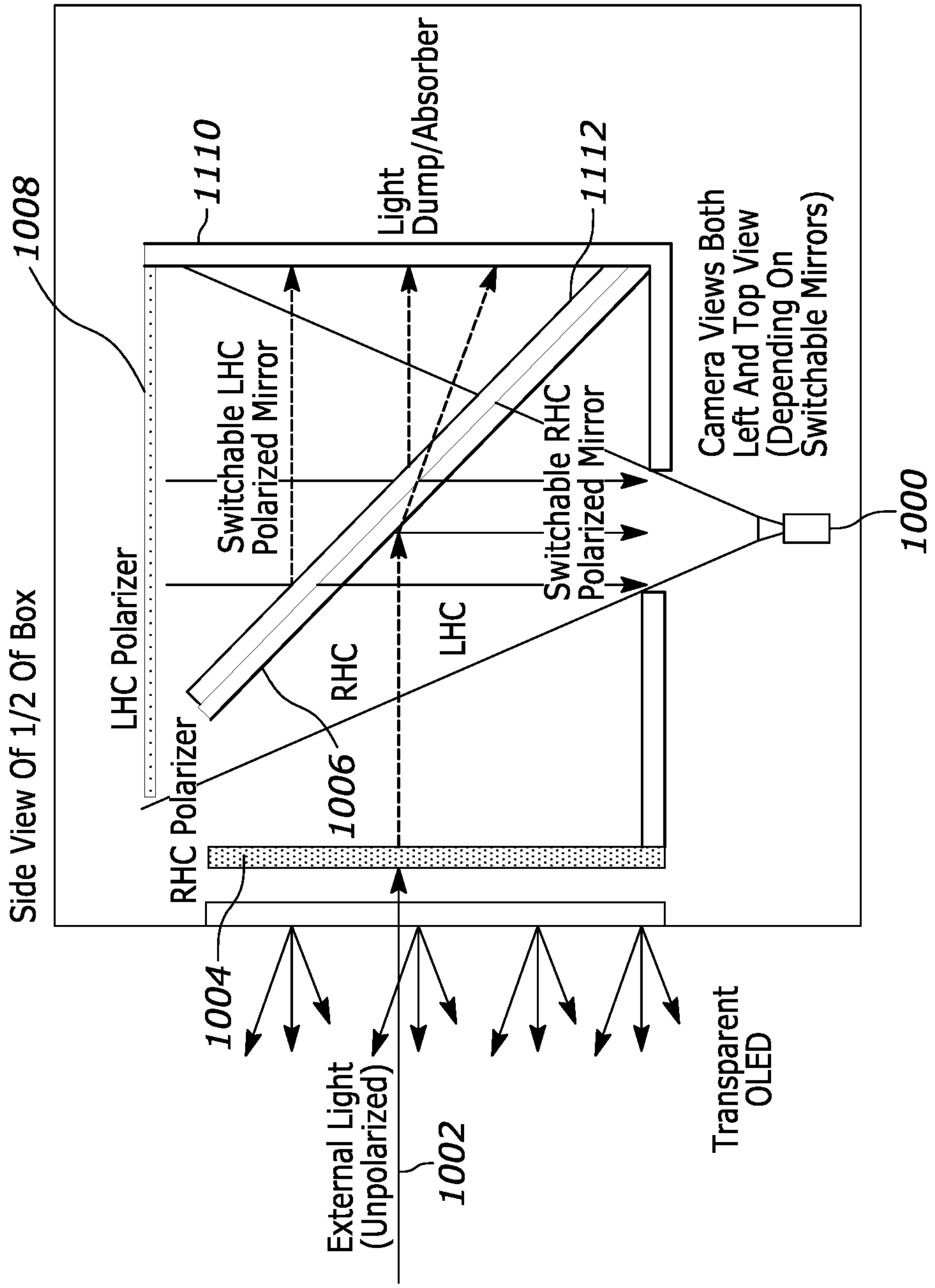
FIGS. 9 and 10 schematically illustrate a first imaging embodiment for imaging the RW background of FIGS. 7 and 8.
Figure 9:
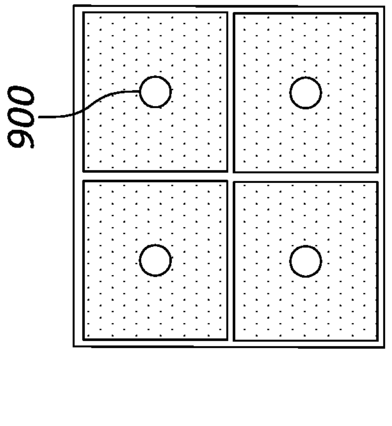

FIG. 9 illustrates a top view of a multi-display assembly with the top display removed to reveal four cameras 900 in the base. FIG. 10 illustrates one-quarter of the assembly shown in FIG. 9, e.g., the upper right quarter. The assembly in FIGS. 9 and 10 includes transparent OLED displays.

In FIG. 10, a camera 1000 can image plural portions of the external real world depending on switchable mirrors. More specifically, unpolarized external light 1002 can enter a polarizer 1004 such as a right hand circular (RHC) polarizer to impinge on a first switchable mirror 1006 such as another polarizer, for reflecting the light to the camera 1000. This view also shows an LHC polarizer 1008 and on the right side a light dump/absorber 1110 such as a black, light absorbing surface. A second switchable mirror 1112 is shown flush against the first mirror 1006.

To perform successive capture of left and top views from a single high-speed camera 1000, the OLED display is turned off to become transparent or is in black insertion frame time. The switchable RHC polarized mirror 1006 is ON, reflecting RHC polarized light from the left view to the camera 1000. LHC polarized light always passes through the RHC mirror 1006.

To prevent capture of the top view during this step, the switchable LHC polarized mirror 1112 is ON, reflecting LHC polarized light from top view to the right side light dump 1110, where it is absorbed. The mirror 1112 reflects only LHC polarized light when on and allows LHC polarized light to pass through when off, whereas RHC polarized light always passes through this mirror.

To switch to capturing the top view, the switchable RHC mirror 1006 is turned off and the switchable LHC mirror 1112 is also turned off, allowing light from the top view to pass to the camera 1000. RHC polarized light from the left view passes through RHC switchable mirror 1006 to the light dump/absorber 1110, and therefore does not impinge on the view from the camera 1000.

Figure 11:
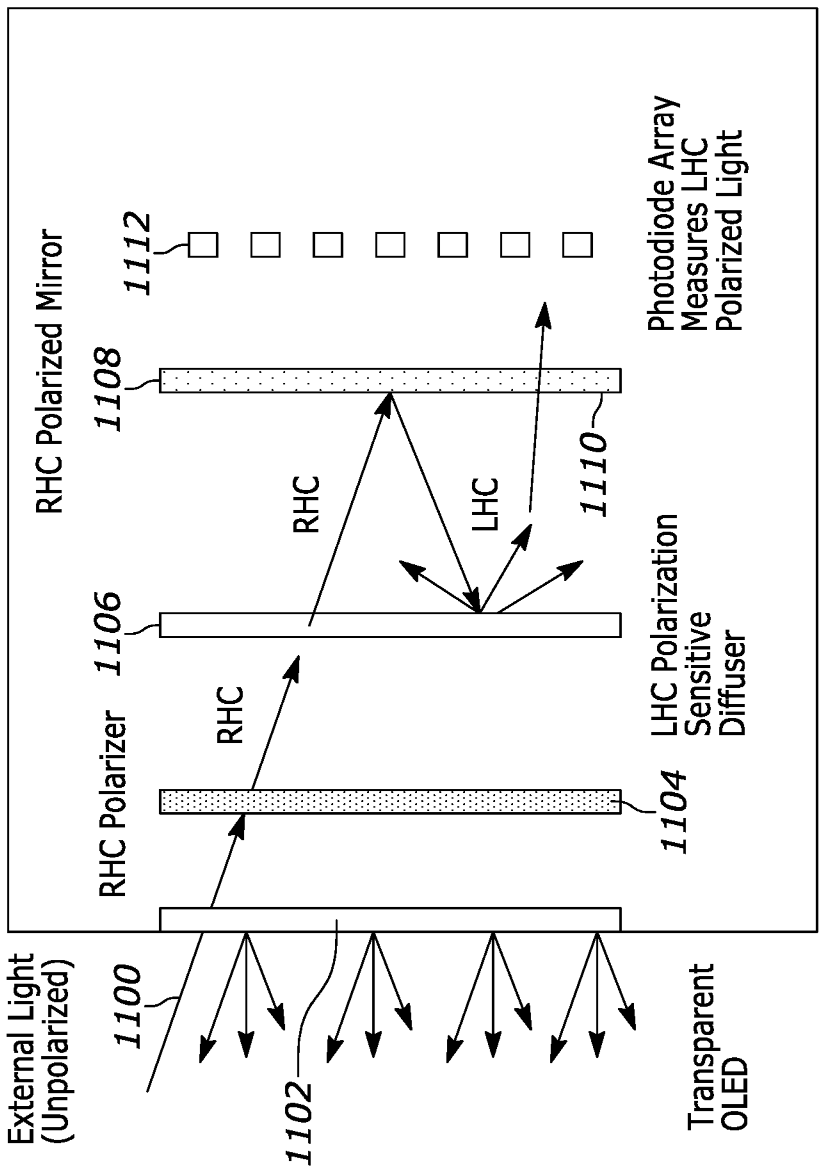
FIG. 11 schematically illustrates a second imaging embodiment for imaging the RW background of FIGS. 7 and 8.
Figure 12:
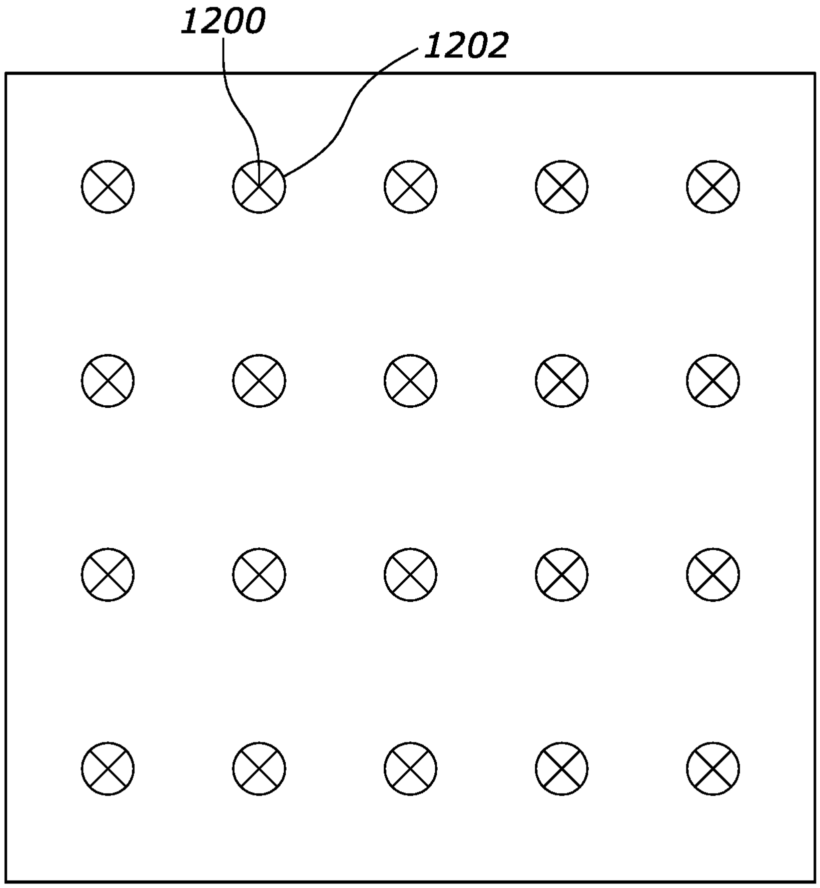
FIG. 12 illustrates that the PD array of FIG. 11 may be implemented as a matrix-like array of PDs.

FIGS. 11 and 12 illustrate an alternate technique using photo diodes to capture the external light from the surrounding background without affecting the OLED screens. Recognizing that transparent OLED backside light transmission can contribute to diffusion that can be detected by a photo diode (PD) array, when measuring external light, the OLED is turned off (equivalently, background light detection is executed during black frame insertion).

FIG. 11 illustrates external unpolarized light 1100 entering the fish tank assembly through a transparent OLED 1102 to impinge upon a RHC polarizer 1104. The light passes through the polarizer 1104 and passes through a LHC polarization diffuser 1106 to impinge upon a RHC polarized mirror 1108. The LHC polarization sensitive diffuser 1106 scatters LHC polarized light while RHC polarized light passes through to the RHC polarized mirror 1108 that reflects only RHC polarized light, changing and reflecting the light from RHC polarized to LHC polarized. The LHC polarized light impinges on the LHC polarization sensitive diffuser, which diffuses the light. The LHC polarized light passes through the RHC polarized mirror to a PD array 1112 that detects the diffused LHC polarized light, which comes from the view outside of the transparent OLED display 1102.

FIG. 12 illustrates that the PD array 1112 of FIG. 11 may be implemented as a matrix-like array of PDs 1200 embedded in respective receptacles 1202 within the assembly.

While particular techniques are herein shown and described in detail, it is to be understood that the subject matter which is encompassed by the present application is limited only by the claims.

What is claimed is:

1. An apparatus comprising:

at least one processor assembly configured to:

determine a first viewing angle between a direction of a user's gaze and a first normal of a first display of a multi-display assembly;

determine a second viewing angle between the direction of the user's gaze and a second normal of a second display of the multi-display assembly, wherein the first and second normals have different orientations;

use the first viewing angle to establish a first brightness and/or a first contrast on the first display;

use the second viewing angle to establish a second brightness and/or a second contrast on the second display;

receive at least one image of at least one real world (RW) view behind the first display from a perspective of the user; and present the at least one image on at least the first display of the multi-display assembly in a display location of the first display that corresponds to where the RW view would be seen through the first display if the first display were a transparent plate.

2. The apparatus of claim 1, wherein the first and second displays comprise liquid crystal displays (LCD).

3. The apparatus of claim 1, wherein the first and second normals are perpendicular to each other.

4. The apparatus of claim 1, wherein the at least one processor assembly is configured to, based on the first viewing angle being zero and the second viewing angle being an oblique angle, establish the second brightness and/or second contrast as greater than the first brightness and/or first contrast.

5. The apparatus of claim 1, wherein the processor assembly is configured to:

use the first viewing angle to establish the first brightness on the first display.

6. The apparatus of claim 1, wherein the processor assembly is configured to:

use the first viewing angle to establish the first contrast on the first display.

7. An apparatus comprising:

at least one computer medium that is not a transitory signal and that comprises instructions executable by at least one processor assembly to:

receive at least one image of at least one real world (RW) view behind a first display of a multi-display assembly from a perspective of a user;

select the first display of the multi-display assembly, the multi-display assembly comprising at least the first display and a second display with respective first and second normals that are perpendicular to each other; and present at least a portion of the image on the first display of the multi-display assembly in a display location of the first display that corresponds to where the RW view would be seen through the first display if the first display were a transparent plate.

8. The apparatus of claim 7, wherein the instructions are executable to:

present at least a portion of the image on at least the second display of the multi-display assembly in a display location corresponding to where the RW view would be seen through the second display were the second display a transparent plate.

9. The apparatus of claim 7, wherein the displays comprise liquid crystal displays (LCD).

10. The apparatus of claim 7, wherein the multi-display assembly comprises third, fourth, and fifth displays, and the first through fifth displays are arranged in a box-shape.

11. The apparatus of claim 7, wherein the instructions are executable to:

determine a first viewing angle between a direction of a user's gaze and a first normal of the first display;

determine a second viewing angle between the direction of the user's gaze and a second normal of a second display of the multi-display assembly, wherein the first and second normals have different orientations;

use the first viewing angle to establish a first brightness and/or a first contrast on the first display; and use the second viewing angle to establish a second brightness and/or a second contrast on the second display.

12. The apparatus of claim 11, wherein the at least one processor assembly is configured to, based on the first viewing angle being zero and the second viewing angle being an oblique angle, establish the second brightness and/or second contrast as greater than the first brightness and/or first contrast.

13. The apparatus of claim 11, wherein the instructions are executable to:

use the first viewing angle to establish the first brightness on the first display.

14. The apparatus of claim 11, wherein the instructions are executable to:

use the first viewing angle to establish the first contrast on the first display.

15. A method, comprising:

determining a first viewing angle between a direction of a user's gaze and a first normal of a first display of a multi-display assembly;

determining a second viewing angle between the direction of the user's gaze and a second normal of a second display of the multi-display assembly, wherein the first and second normals have different orientations;

using the first viewing angle to establish a first brightness and/or a first contrast on the first display;

using the second viewing angle to establish a second brightness and/or a second contrast on the second display;

receiving at least one image of at least one real world (RW) view behind the first display from a perspective of the user; and presenting the image on at least the first display of the multi-display assembly in a display location of the first display that corresponds to where the RW view would be seen through the first display if the first display were a transparent plate.

16. The method of claim 15, wherein the displays comprise liquid crystal displays (LCD).

17. The method of claim 15, wherein the first and second normals are perpendicular to each other.

18. The apparatus of claim 1, wherein the first and second displays are opaque panels.

19. The apparatus of claim 11, wherein the first and second displays are opaque panels.

20. The method of claim 15, wherein the first and second displays are opaque panels.

* * * * *